ated Aug. 26, 1919.
UNITED STATES PATENT OFFICE.

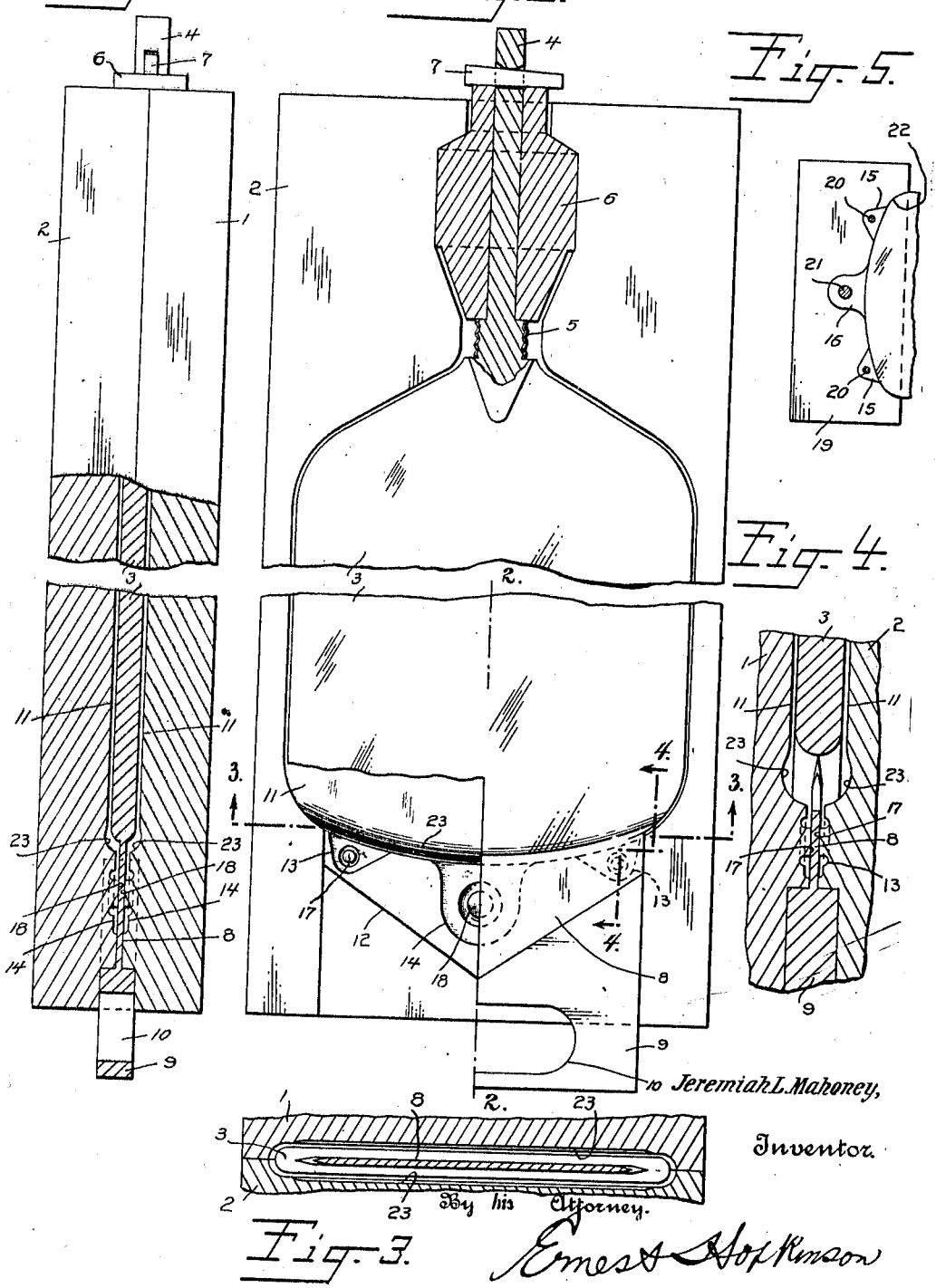
J. L. MAHONEY.
MOLD FOR VULCANIZING RUBBER ARTICLES.
APPLICATION FILED SEPT. 4, 1918.
1,314,344.
Patented Aug. 26, 1919.
2 SHEETS—SHEET 1.
Jeremiah L. Mahoney,
Inventor.
By his Attorney.
Ernest Hopkinson

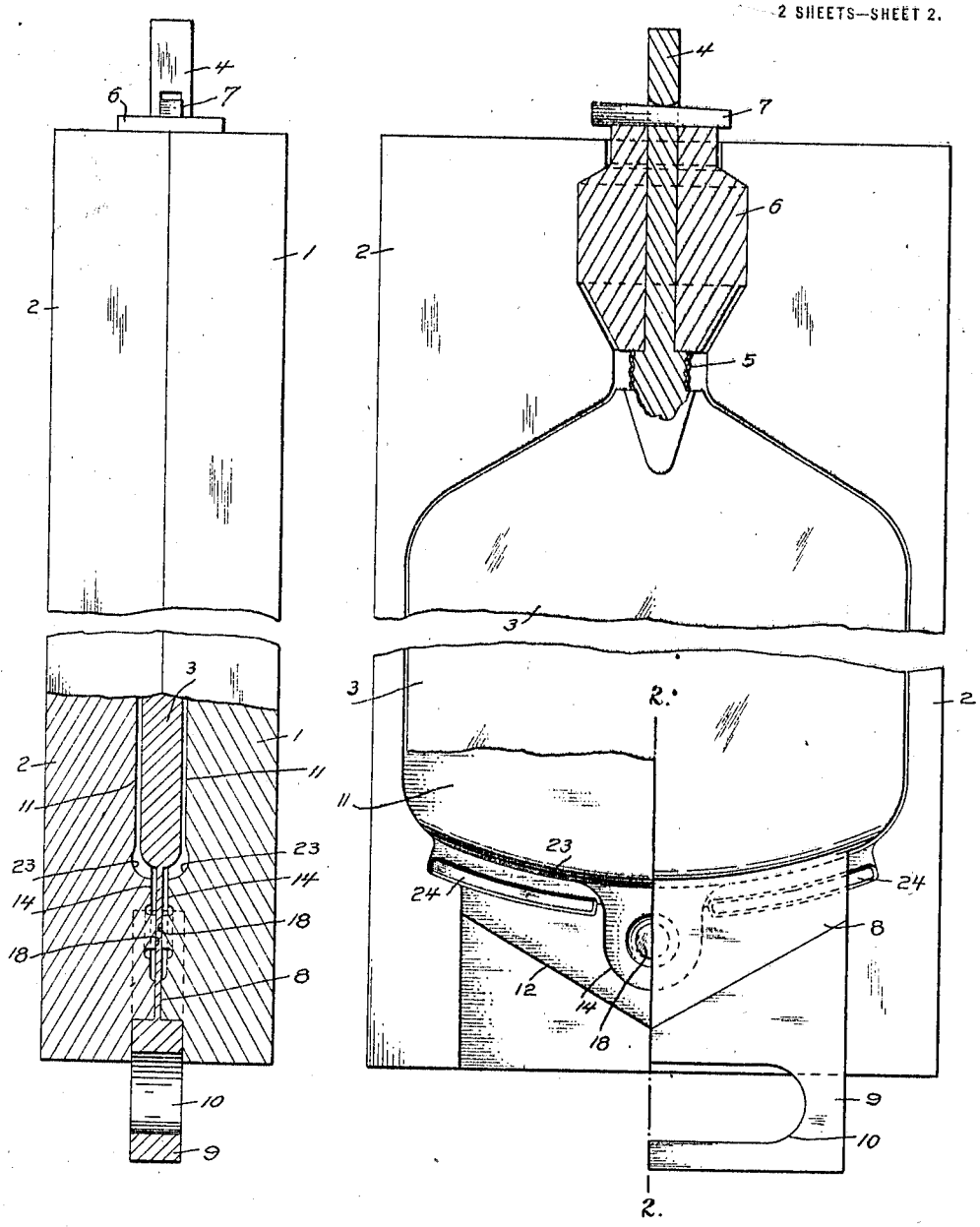

JEREMIAH L. MAHONEY, OF NEW HAVEN, CONNECTICUT, ASSIGNOR TO THE GOODYEAR'S INDIA RUBBER GLOVE M'F'G CO., A CORPORATION OF CONNECTICUT.

MOLD FOR VULCANIZING RUBBER ARTICLES.

1,314,344. Specification of Letters Patent. Patented Aug. 26, 1919.

Original application filed May 21, 1917, Serial No. 169,818. Divided and this application filed September 4, 1918. Serial No. 252,549.

*To all whom it may concern:*

Be it known that I, JEREMIAH L. MAHONEY, a citizen of the United States, residing at New Haven, county of New Haven, State of Connecticut, have invented certain new and useful Improvements in Molds for Vulcanizing Rubber Articles, of which the following is a full, clear, and exact description.

This invention relates to molding apparatus for manufacturing hollow rubber articles such as hot water bottles which are molded as a complete unitary article about a central core, the core being removed through an opening formed during the molding operation.

An object of the invention is to provide molding apparatus capable of producing hot water bottles and other hollow articles free from the defects heretofore present therein, enabling a superior product to be produced at a very low cost of manufacture.

Other objects of the invention will hereinafter appear.

A practical embodiment of the invention is represented in the accompanying drawings forming a part of this specification, in which similar characters of reference indicate corresponding parts in all the views, the said invention being more fully described hereinafter and pointed out in the appended claims.

This application is a division of my copending application, Serial No. 169,818.

In the drawings;

Figure 1 is a plan view of one of the mating mold members and a core for forming a water bottle, a portion of the core being broken to show more clearly certain of the details of the mold members.

Fig. 2 is a side elevation of the two mating mold members and the core in assembled position, the lower portion of the parts being shown cut away and in section, the section being taken substantially on the line 2—2 of Fig. 1.

Fig. 3 is a sectional view of the assembled parts taken substantially on the line 3—3 of Fig. 1.

Fig. 4 is an enlarged sectional view of the assembled parts taken substantially on the line 4—4, Fig. 1.

Fig. 5 is a plan view of one of the members of the final cure mold for closing the opening in the bottle through which the core has been removed, a water bottle being shown positioned therein.

Fig. 6 is a plan view showing a modified form of the construction illustrated in Fig. 1.

Fig. 7 is a sectional view taken substantially on the line 2—2 of Fig. 6.

Referring to the drawings, the numerals 1 and 2 indicate the two outer mating mold members; the numeral 3 indicates the core for the interior of the bottle; 4 indicates the stud or rod extending from the core 3 on the lower or inner end of which is carried the usual threaded nipple or thimble 5 forming a socket for the stopper and about which the rubber neck portion is molded. Numeral 6 indicates the core for forming the funnel portion of the bottle and nipple through an opening in which the stud 4 projects. The core is held in position by any suitable means, such as, a tapering pin or wedge 7 which passes through an opening in the stud 4. Projecting from the lower end of the core 3 is a fin 8 which is enlarged at its outer end 9 and provided with an opening 10 through which the hand may be passed when removing the core from the mold and in stripping the bottle from the core. The fin 8 is adapted to form an opening in the lower end of the bottle through which the core may be removed.

The opposed faces of the mating mold members 1 and 2 are each provided with a recess 11 shaped to give the desired form to the body of the bottle and a recess 12 adapted to receive the fin 8 of the core. Disposed within the fin recess of each of the mold members and communicating with the body recess are recesses 13 and 14 shaped to form tabs 15 and 16 on the bottom of the bottle. Within the tab recesses 13 and 14 are projections 17 and 18 adapted to form openings through the tabs. These projections are spaced a definite distance from the adjacent end of the body recess 11, such for instance as ⅜" in the case of the projections 17 and ⅝" in the case of the projection 18. In the final valcanizing mold members 19, one of which is shown in Fig. 5 of the drawing, dowel pins 20 and 21 are provided, the centers of which are separated by a slightly greater distance from the end of the recess 22 than are the centers of the projections 17 and 18 from the end of the corresponding recess 11 in the first or forming mold, for instance, the centers of these dowel pins may be $\frac{7}{16}''$ and $\frac{11}{16}''$ respectively from the end of the body recess. This arrangement permits the rubber of the tab members to be stretched to a slight extent in the finishing mold for the purpose of drawing the base of the bottle closely against the ends of the recesses 22, enabling the opening in the bottle to be accurately closed. During final vulcanization for closing the opening in the bottle, the bottle is suspended by its lower end in order to eliminate distortion of the rubber during the vulcanizing process. The weight of the bottle in this position does not affect the accurate registry of the parts or the accurate shaping of the bottle because the base portion thereof is held firmly suspended between the mold members under tension of the rubber forming the tabs which tension operates to force the lips of the opening in the bottle closely together at all points.

In order that the opening formed in the lower end of the bottle through which the core is removed may have sharp or acute ends so that the walls of the bottle adjacent thereto may be accurately brought together the margins of the fin are tapered so as to form sharp edges as indicated in Figs. 3 and 4.

It is desirable in forming the bottle to give the margins about the opening an outward bulge so that when the closure is effected, the outer surfaces of the margin about the opening will be brought to assume relative positions corresponding to the relative positions of the margins about the remainder of the body portion of the bottle in order to preserve uniformity of appearance about the entire body of the bottle. For this purpose the body recess 11 of each of the mating mold members 1 and 2 is formed with a concave deepened portion 23 adjacent the fin receiving recess adapted to give an outward bulge to the base of the bottle.

According to the modification shown in Figs. 6 and 7, the tab forming recesses 13 and 14 of the mating mold members are deepened at their lower ends to provide concave channels 24 shaped to form a bead upon the ends of the tabs adapted to be secured in suitable retaining recesses in the final cure mold members.

While I have described my invention in detail, it is to be understood that various modifications in the form and arrangement of the parts may be resorted to without departing from the spirit or sacrificing any of the advantages of the invention defined in the appended claims.

Having thus described my invention, what I claim and desire to protect by Letters Patent is:

1. A mold for rubber water bottles and the like comprising a core having a projection adapted to form an opening in the wall of the bottle spaced from the neck thereof, and outer mold members having cavities therein adapted to form the walls of the bottle, said cavities being deepened at points adjacent the opening producing projection of the core for the purposes as described.

2. A mold for rubber water bottles and the like comprising a core having a projection adapted to form an opening in the edge of the bottle spaced from the neck thereof, and outer mold members having cavities therein adapted to form the walls of the bottle, said cavities being deepened at points adjacent the opening producing projection of the core by an amount collectively equal to the width of the opening less the final thickness of the rubber closure employed in sealing the opening.

3. In a mold for hollow rubber articles, a core having a projection extending from its lower edge adapted to form an opening in the bottom of the article, said projection having opposite margins tapered to sharp edges to form acute angles at the ends of said opening.

4. A mold for hollow rubber articles, comprising a core having a projection extending from its lower edge adapted to form an opening in the bottom of the article, and outer mold members having cavities therein adapted to form the walls of the bottle, said cavities being deepened at points adjacent the opening producing projection of the core for the purposes specified and recesses for forming projecting parts adapted to hold said article in a secondary curing mold under tension when closing said opening.

5. A mold for rubber water bottles and the like comprising a core having a projection adapted to form an opening in the bottom of the bottle, and outer mold members having cavities therein adapted to form the walls of the bottle, said cavities being deepened at points adjacent the opening producing projection of the core for the purposes specified.

Signed at New Haven, Conn., this 28th day of August, 1918.

JEREMIAH L. MAHONEY.